United States Patent [19]
Yamashita et al.

[11] Patent Number: 5,894,717
[45] Date of Patent: Apr. 20, 1999

[54] MULCHING MOWER

[75] Inventors: Tadashi Yamashita; Kenji Higashi; Yutaka Tabata, all of Wako, Japan

[73] Assignee: Honda Giken Kogyo Kabushiki Kaisha, Tokyo, Japan

[21] Appl. No.: 08/775,933

[22] Filed: Jan. 2, 1997

[30] Foreign Application Priority Data

| Jan. 5, 1996 | [JP] | Japan | 8-017142 |
| Jan. 5, 1996 | [JP] | Japan | 8-017143 |
| Jan. 5, 1996 | [JP] | Japan | 8-017145 |
| Jan. 5, 1996 | [JP] | Japan | 8-017146 |

[51] Int. Cl.$^6$ ................................ A01D 34/68
[52] U.S. Cl. ................ 056/320.1; 56/17.5; 56/255; 56/295
[58] Field of Search ............... 56/320.1, 320.2, 56/17.5, 255, 295, DIG. 17, DIG. 20, DIG. 5, DIG. 8, DIG. 9, DIG. 22

[56] References Cited

U.S. PATENT DOCUMENTS

| 5,035,108 | 7/1991 | Meyer et al. | 56/17.5 X |
| 5,133,176 | 7/1992 | Bauman et al. | 56/17.4 |
| 5,209,052 | 5/1993 | Carroll | 56/17.5 X |
| 5,214,906 | 6/1993 | Saki et al. | 56/320.2 |
| 5,259,176 | 11/1993 | Kahamura et al. | 56/255 |
| 5,321,940 | 6/1994 | Peterson | 56/295 X |
| 5,457,947 | 10/1995 | Samejima et al. | 56/17.5 X |
| 5,488,821 | 2/1996 | McCunn et al. | 56/320.1 X |

FOREIGN PATENT DOCUMENTS

| 4-55226 | 5/1992 | Japan . |
| 6-75445 | 9/1994 | Japan . |

*Primary Examiner*—Terry Lee Melius
*Attorney, Agent, or Firm*—Armstrong, Westerman, Hattori, McLeland & Naughton

[57] ABSTRACT

A mulching mower is provided which is capable of cutting grasses finely without leaving uncut grasses and which is capable of discharging the cut grass clippings onto the cut grass path so as to be evenly dispersed. A pair of cutter blades are arranged to the right and to the left of the mulching mower in a cutter housing which opens downwardly. A guitar-shaped or figure 8 shaped enclosure wall hangs down from an under surface of an upper wall of the cutter housing to completely surround the periphery of the right and left cutter blades along tip end rotation loci of the blades at a slight distance therefrom. The enclosure wall is formed by side wall portions at right and left outsides of the cutter housing and front and rear enclosure wall portions hang down from the under surface. The cutter blades rotate in opposite directions from each other so that tip ends of the cutter blades move from front to rear at right and left outsides, respectively, of the mulching mower. A plate-like separator member extends from a position on the approximate center of the rear enclosure wall portion to a vicinity of a rotary shaft of the cutter blade which is across the direction of rotation of the cutter blade.

14 Claims, 10 Drawing Sheets

MULCHING MOWER

BACKGROUND OF THE INVENTION

The present invention generally relates to a rotary mower having a pair of cutter blades which are arranged in a cutter housing for horizontal rotation and more particularly, to a mulching mower in which grass clippings, mown and then cut finely by cutter blades, are discharged to the cut grass path and are submerged as mulch under the grass surface at the cut grass path.

Hitherto, a mower, which has a pair of horizontally rotating cutter blades arranged to the right and to the left in a downwardly opening cutter housing has been known, for example, as shown in Japanese Patent Publication No. Hei 6-75445 (1994) (hereinafter "JP '445").

In the mower disclosed in JP '445, right and left cutter blades are arranged so as to be staggered in front and rear directions so that the loci of rotation of the right cutter blade overlaps the loci of rotation of the left cutter blade in the vicinity of the longitudinal center line of the mower, when viewed from the front. Further, the cutter blade on the right side, with respect to the running direction, rotates clockwise and the cutter blade on the left side, with respect to the running direction, rotates counterclockwise. In this way, grasses, which have been trampled down ahead of the mower by the front wheels thereof, can be mowed surely by the right and left cutter blades.

The mower of JP '445 is of a rear discharge type having a discharge port provided in a rear wall section of the cutter housing and discharge scroll guide plates for guiding grasses, mown by the right and left cutter blades, to the discharge port. The mown grasses are received in a grass bag or discharged directly on the cut grass path to the rear of the mower. When the mown grasses are received in a grass bag, the cut grass clippings must be emptied from the grass bag. When the mown grasses are discharged directly on the cut grass path, discharged grass clippings fall on the cut grass path unevenly to deteriorate the appearance of the cut grass path and grasses discharged at a place where the grass clippings become piled up are apt to be blasted due to poor air ventilation.

Compare with this, in the mulching mower of the present invention, grass clippings cut by the cutter blade are discharged comparatively evenly onto the cut grass path directly below the cutter housing from the upper side so that such inconveniences as mentioned above can be avoided.

In FIG. 5 of U.S. Pat. No. 5,133,176 (hereinafter "the '176 patent"), a mulching mower is shown, which has a plurality of horizontally rotating blades arranged to the right and left in a downwardly opening cutter housing. The rotating blades are staggered to the front and to the back to overlap similarly to the rear discharge type mower of JP '445.

The mulching mower of the '176 patent has a cutter housing with a side wall which hangs down along the peripheral edge. Within the cutter housing, shrouds hang down which surround three cutter blades arranged to form circular cutting chambers. The shrouds are connected to each other through opening portions so that the circular cutting chambers communicate with each other and the shrouds form an enclosure wall completely surrounding an outer periphery of the three cutter blades in the arrangement.

The three cutter blades are arranged to rotate in the same direction within the enclosure wall. In each of the cutting chambers, kickers are provided which are projected from an under surface of an upper wall so that grass clippings, cut by the cutter blade and circulating within the cutting chamber, are deflected downwardly by the kickers to be discharged directly below and onto the cut grass path.

In the conventional mulching mower of the '176 patent, since the enclosure wall, which completely surrounds an outer periphery of a plurality of cutter blades in the arrangement, must be independently formed within the cutter housing, the cutter housing becomes large compared with the range of rotation of the cutter blades and accordingly, the weight is increased.

In addition, since all of the cutter blades rotate in the same direction, the grass clippings are apt to be biased to the right side or to the left side in the enclosure wall surrounding the cutter blades in the arrangement, and it is difficult to discharge the grass clippings so as to be dispersed uniformly over the entire area under the cutter housing. In order to ensure uniform dispersion of the grass clippings, it is necessary to provide kickers for each of the cutter blades for dropping grass clippings, cut by a cutter blade, beneath the same cutter blade. Therefore, the construction of the mulching mower becomes complicated.

Generally, the mulching mower has no discharge port at the side wall section. Therefore, mown grass clippings are circulated along the inner surface of the enclosure wall, which surrounds the outer periphery of the cutter blade. The mown grass clippings are dispersed evenly and discharged downwardly, out of the cutter housing by downwardly directed wind at the outer periphery of the cutter blade caused by rotation of the cutter blade.

However, at a juncture portion where tip end rotation loci of adjacent cutter blades approach each other, and where the enclosure wall cannot be provided, a communicating opening is formed as described above, and the grass clippings are not guided by any enclosure wall. Therefore, an especially large quantity of grass clippings fall down at the juncture portion. As the result, the grass clippings do not fall on the cut grass path so as to be dispersed evenly and unsightly clumps of mown grass clippings are left on the lawn.

Further, at the juncture portion, the wind blows out downwardly to cause uncut grasses to lay down before the cutter blade passes over them, so that the uncut grasses are apt to be left behind.

Since grasses to be cut by the cutter blade contain a large amount of water, the cut grass clippings will adhere to the inner surface of the enclosure wall. The grass clippings which adhere to the enclosure wall are scraped off by outer ends of the rotating cutter blade, but if the scraping off of the grass clippings from the enclosure wall is not carried out sufficiently, large clumps of the grass clippings fall down periodically or the grass clippings which adhere to the enclosure wall lock the cutter blade so that sometimes continuation of the mowing function by the mower becomes impossible.

By the way, Japanese Laid-Open Utility Model Publication No. Hei 4-55226 (1952) (hereinafter "JP '226") discloses a mower having upper and lower cutter blades, rotating approximately horizontally, provided on a lower end portion of an approximately vertical rotary shaft, in which a cutting edge of the upper cutter blade is positioned ahead of the cutting edge of the lower cutter blade in the direction of the blade rotation so that tip end parts of the grasses are cut by the upper cutter blade first and then, lower parts of the grasses are cut by the following lower cutter blade, and the grasses are thereby finely cut.

In the mower of JP '226, the width, in the rotational direction of the cutting edge portion of the lower cutter blade, is made wider than the width of the upper cutter blade to form a ventilating passage between the upper and lower cutting edge portions. The cutting edge portion of the lower cutter blade is provided with a rising portion, at the rear side with respect to the direction of rotation, for changing the direction of the wind within the ventilating passage upwardly.

Generally, a rising portion (feather portion) such as is formed on a rear side of a cutting edge portion of a cutter blade, is provided for generating a pulsatile wind within the cutter housing by rotation of the cutter blade. Grasses are raised by pulsation of the wind and cut by the cutter blade. Therefore, the grasses can be mown simply with a good finish.

Further, in the mulching mower of JP '226, finely cut grass clippings are dispersedly discharged onto the lower cut grass path from the cutter housing by the pulsation of the wind and pushed under the grass surface of the cut grass path. Therefore, it is unnecessary to dump the cut grass clippings in a suitable place in order to maintain the pleasing aesthetic look of the cut grass path.

In order to generate wind pulsation sufficient to dispersedly discharge the grass clippings within the cutter housing, the rising portion must be of a considerable height. Particularly, in the mower of JP '226, while grasses are cut by tow upper and lower cutter blades, the wind pulsation is generated by the rising portion formed on the lower cutter blade only, so that it is difficult to obtain the amount of wind necessary for raising the grasses.

If the rising portion is made of a considerable height, the necessary amount of wind can be obtained. But in this case, because air resistance and resistance by grass clippings acting on the rising portion are increased, the strength of the cutter blade must be increased. Thus, the lower cutter blade becomes robust and heavy and the cost thereof is also increased.

In addition, since the upper and lower blades are very different in shape and construction, different upper and lower blades must be provided in the manufacture of the mower and also, two kinds of cutter blades must be prepared for use of the mower. This is disadvantageous in respect of both production and maintenance.

SUMMARY OF THE INVENTION

The present invention has been accomplished in view of the above-described drawbacks of the prior art. According to an aspect of the present invention, a mulching mower is provided which includes a pair of cutter blades that rotate approximately horizontally and that are arranged to the right and to the left in a cutter housing which opens downwardly. The mulching mower comprises: cutter blades, rotating in opposite directions to each other, so that tip ends of the cutter blades move from front to rear at both the right outside and the left outside of the mower; side wall portions, at the right outside and the left outside of the cutter housing extend along a tip end rotation locus of a corresponding one of the cutter blades at a slight distance; a front enclosure wall portion connects front parts of the side wall portions with each other and hangs down from an under surface of an upper wall of the cutter housing, wherein the front enclosure wall portion has right and left arcuate portions, each extending along the tip end rotation locus of the corresponding one of the cutter blades at a slight distance therefrom and each being connected to the other at a middle of the front enclosure wall portion; and a rear enclosure wall portion connects rear parts of the side wall portions with each other and hangs down from the under surface, wherein the rear enclosure wall portion has right and left arcuate portions, each extending along the tip end rotation locus of the corresponding one of the cutter blades at a slight distance therefrom and each being connected to the other at a middle of the rear enclosure wall portion. The right and left side wall portions and the front and rear enclosure wall portions form a guitar-shaped enclosure wall completely surrounding the right and left cutter blades along the tip end rotation loci of the blades.

Since the mulching, mower of the present invention has a pair of cutter blades arranged to the right and to the left, and since tip end rotation loci of the cutter blades slightly overlap each other when viewed in front and rear directions, grasses can be mown over a broad width without an uncut area remaining at the center. Moreover, since the periphery of the cutter blades, along the tip end rotation loci, is completely surrounded by the enclosure wall, grass clippings mown by the cutter blades are confined within the enclosure wall, are recut again so as to be fine, and are then discharged directly below, through a lower opening of the enclosure wall, to be submerged into the grasses of the cut grass path as mulch.

In the present invention, since the enclosure wall is formed in a guitar-shaped by connecting the two circular parts surrounding the periphery of each cutter blade, and since the cutter blades rotate in opposite directions to each other to mow the grass at the front part in the two circular parts rotating towards the outside in right and left directions, grass clippings, cut in one of the circular parts by the corresponding cutter blade, remain within the same circular part, without moving to another circular part, and are discharged below the same circular part. Therefore, even if kickers, for directing grass clippings downwardly, are not provided, grass clippings fall on the cut grass path below the portion surrounded by the enclosure wall, and are dispersed evenly all over the entire area so that a good mulching results.

Since the cutter rotates so as to move from front to rear at the right outside and the left outside of the mower, respectively, (i.e., rotate so as to raise the grasses laid down ahead of the mower by the front wheels), grasses in the paths of the wheels also can be mown to a good finish.

Further, the enclosure wall surrounding the cutter blades is not separately provided within the cutter housing, but both side portions are formed utilizing side wall portions of the cutter housing at right and left outsides thereof, and the enclosure wall is formed by merely adding the front and rear enclosure wall portions of simple shapes to both side portions, so that a cutter housing of small size, light weight and simple construction can be obtained.

If the cutter housing also open rearwardly and the rear enclosure wall portion is made detachable from the cutter housing, it is possible to easily transform the mulching mower into a rear discharge type mower, as occasion demands.

According to another aspect of the present invention, a mulching mower is provided which has a pair of cutter blades, rotating approximately horizontally, and arranged to the right and to the left in a downwardly opening cutter housing. A guitar-shaped enclosure wall hangs down from an under surface of an upper wall of the cutter housing to completely surround a periphery of the right and left cutter blades along tip end rotation loci of the blades. Circular cutter chambers are formed by the enclosure wall, around the right and left cutter blades, respectively. The circular cutter chamber communicate with each other at a central portion where the right and left tip end rotation loci approach each other. The circular cutter chamber each have the cutter blades rotating in opposite directions from each other so that tip ends of the cutter blades move from front to rear at right and left outsides of the mower, respectively. A plate-like separator member extends from a position on a rear wall portion of the enclosure wall near the central portion, to a vicinity of a rotary shaft of the cutter blades across the direction of rotation of the cutter blade. The plate-like separator is arranged about vertically between the under surface of the upper wall of the cutter housing and the cutter blade.

Within each of the cutter chambers, a wind is generated by rotation of the cutter blade which circulates in the direction of the cutter blade rotation. The winds in both cutter chambers flow into the central portion where the right and left tip end rotation loci approach each other (hereinafter referred to as "blade approaching portion") from behind and join.

According to the present invention, in each cutter chamber, the plate-like separator member is provided at the place where the wind flows into the blade approaching portion, on an upper position. That is, between the under surface of the under wall of the cutter housing and the cutter blade, extended across either the direction of rotation of the cutter blade or the direction of the wind and arranged about vertically, so that the wind flowing into the blade approaching portion is obstructed by the separator member at the upper portion and only a portion of the wind passing under the separator member can flow into the blade approaching portion.

Since the downstream side of the separator member which obstructs the wind comes to a low pressure state, the wind which flowed into the blade approaching portion from under the separator member now flows toward the upper low pressure portion to generate an upward wind at the blade approaching portion. By this upward wind, grasses, which previously would have been cut at the blade approaching portion, are raised and then cut by the following cutter blade.

Thus, grasses can be mown without uncut grasses being left behind to leave a good finish.

The upward wind generated at the blade approaching portion reduces the quantity of the grass clippings falling down from that portion. Therefore, an especially large quantity of grass clippings are prevented from falling down there as before. Further, a high pressure portion is caused at an upstream side of the separator member as the result of obstructing the wind and a downward wind generated by the high pressure portion promotes discharging of grass clippings. Therefore, the grass clippings are discharged on the cut grass path under the cutter housing and are well dispersed, without being accumulated in a large quantity or clump, to improve the looks of the cut grass path.

In the mulching mower, each of the front and rear wall portions of the enclosure wall may be formed by right and left arcuate portions. Each of the right and left arcuate portions extends along the tip end rotation locus of a corresponding one of the cutter blades at a slight distance therefrom and each is connected to the other at a middle of the front and rear enclosure wall portions, respectively. Thus a radius of curvature at the middle of the front wall portion may be made smaller than the radius of curvature of the rear wall portion.

Because of the fact that an especially large quantity of grass clippings fall down and are discharged at the blade approaching portion as described above, it can be further pointed out that grass clippings, intruding on the blade approaching portion from behind, directly collide with the front wall portion of the enclosure wall and fall down.

According to the present invention, since the central part of the front wall portion, with which the grass clippings collide, has a small radius of curvature, the grass clippings are diverted by the central part having the small radius of curvature so as to flow along the right and left arcuate portions. In addition, since the radius of curvature of the central part of the rear wall portion is relatively large, grass clippings flowing into the blade approaching portion along the rear wall portion are suitably dispersed to the right and to the left so that the quantity of grass clippings colliding with the central part of the front wall portion is reduced. Therefore, the quantity of grass clippings which directly collide with the front wall portion of the enclosure wall and then fall down, is remarkably reduced, and a good dispersion of grass clippings is ensured.

According to another aspect of the present invention, a mulching mower is provided which has a cutter blade rotating approximately horizontally in a downwardly opening cutter housing and a circular enclosure wall which surrounds a periphery of the cutter blade along a tip end rotation locus of the cutter blade at a slight distance therefrom. The cutter blade includes: a cutting edge at a radially outer and rotationally leading side; a feather section which rises obliquely upwardly at a trailing side thereof; and a shape, in plan view, of an outer end of the cutter blade which is formed in a circular arc which is concentric with the enclosure wall.

In the present mulching mower, the outer end face of the cutter blade scrapes off grass clippings which adhere to the inner surface of the enclosure wall. The outer end face of the cutter blade extends along the inner surface over a wide range in the rotational direction of the blade. The outer end face of the cutter blade also extends from the low cutting edge to the high upper end of the feather section. Therefore, the cutter blade rotates and the outer end face scrapes off the adhering grass clippings uniformly and surely. Accordingly, unscraped grass clippings are not inconveniently accumulated, large quantities of the grass clippings do not fall down periodically, and adhering grass clippings do not lock the blade.

According to yet another aspect of the present invention, a mulching mower is provided which has a rotary shaft provided approximately vertically in a downwardly opening cutter housing and upper and lower cutter blades, which are provided on a lower portion of the rotary shaft so as to rotate about horizontally. Each upper and lower cutter blade has a cutting edge portion with a cutting edge at a leading edge. Thus, widths of the cutting edge portions of the upper and lower cutter blades are nearly equal in the rotational direction. Similar feather sections, which are twisted upwardly, are formed at trailing edges of the cutter edge portions. The upper and lower cutter blades are fitted to the rotary shaft. A space is left vertically between the cutter blades so that the cutting edge of the upper cutter blade is positioned rotationally ahead of the cutting edge of the lower cutter blade.

In the mulching mower of the present invention, a pulsatile wind is generated in the cutter housing by the feather sections, which are formed on the upper and lower cutter blades, to raise the grasses. First, upper parts of the raised grasses are cut off by the cutting edge of the upper cutter blade which is positioned rotationally ahead. Then, lower parts of the raised grasses are cut off by the cutting edge of the lower cutting blade positioned rotationally behind. Thus, grasses are mown evenly to leave a good finish and finely cut grass clippings are obtained.

The finely cut grass clippings are guided by the feather section, which is twisted upwardly on the cutting edge portion, to pass through the cutting edge portion upwardly. Then, either the wind pulsation or the high pressure at an upper part within the cutter housing which is caused by the wind being directed upwardly by the feather section, causes the grass clippings to be dispersed and discharged onto the cut grass path under the cutter housing to be submerged under the surface of grasses at the cut grass path as mulch.

The rotational phase difference, between the upper and lower cutter blades for cutting grasses finely, is relatively small. Therefore, the feather sections of the upper and lower cutter blades cooperate to fulfill a function similar to that of a single feather section which lifts the grass high and which causes the desired wind pulsation within the cutter housing. Accordingly, the feather sections of the cutter blades can be positioned relatively low to reduce resistance acting on the cutter blades in rotation. As a result, construction of the cutter blades can be simplified by reducing the weight and lowering the cost. Further, according to the present invention, the upper and lower cutter blades can be made in the same shape so that manufacturing of the mower is simplified even more and the cost is lowered even more.

DETAILED DESCRIPTION OF THE PREFERRED EMBODIMENT

Figure 1:
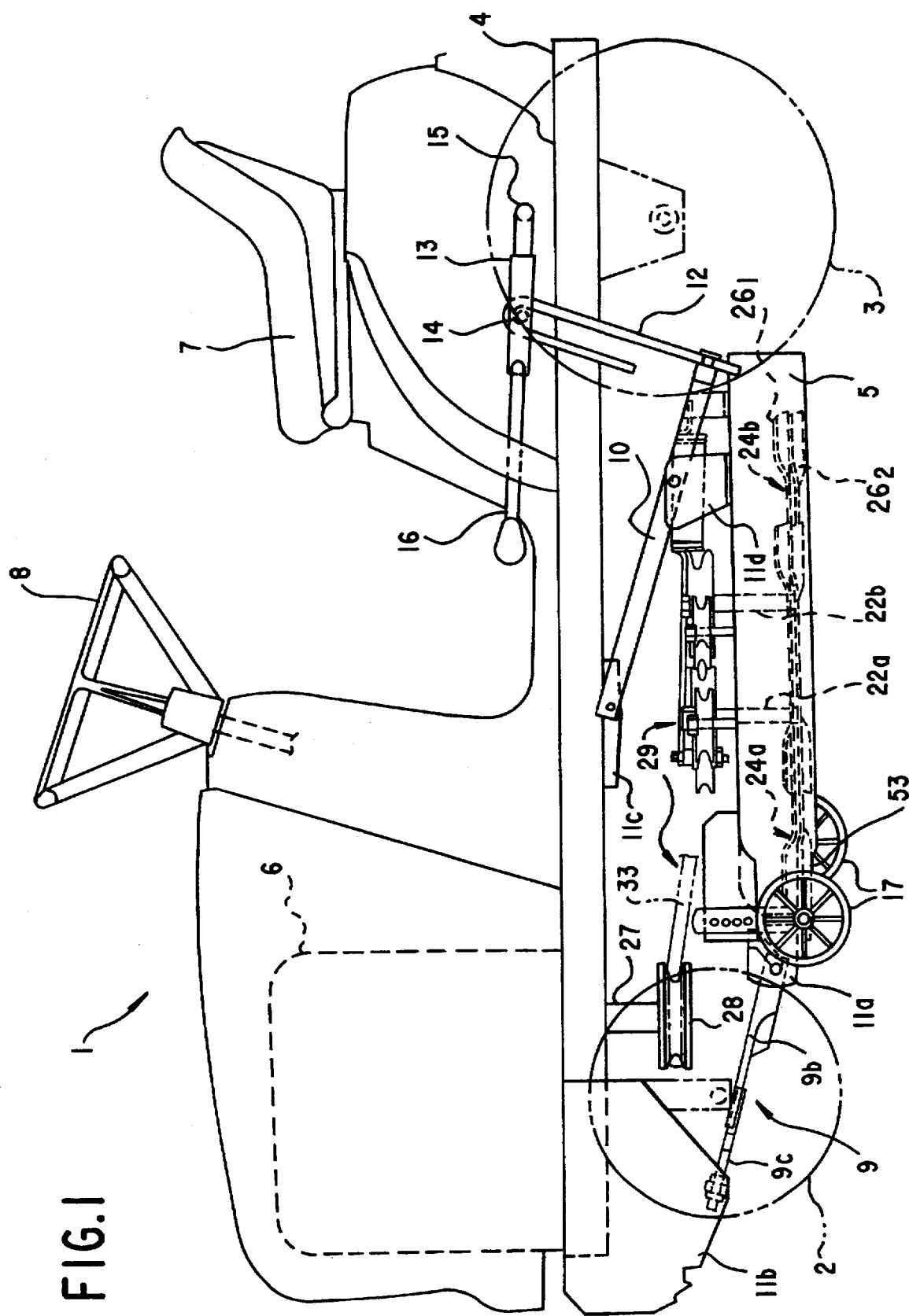
FIG. 1 is a side view of a riding mulching mower according to the present invention.
Figure 2:
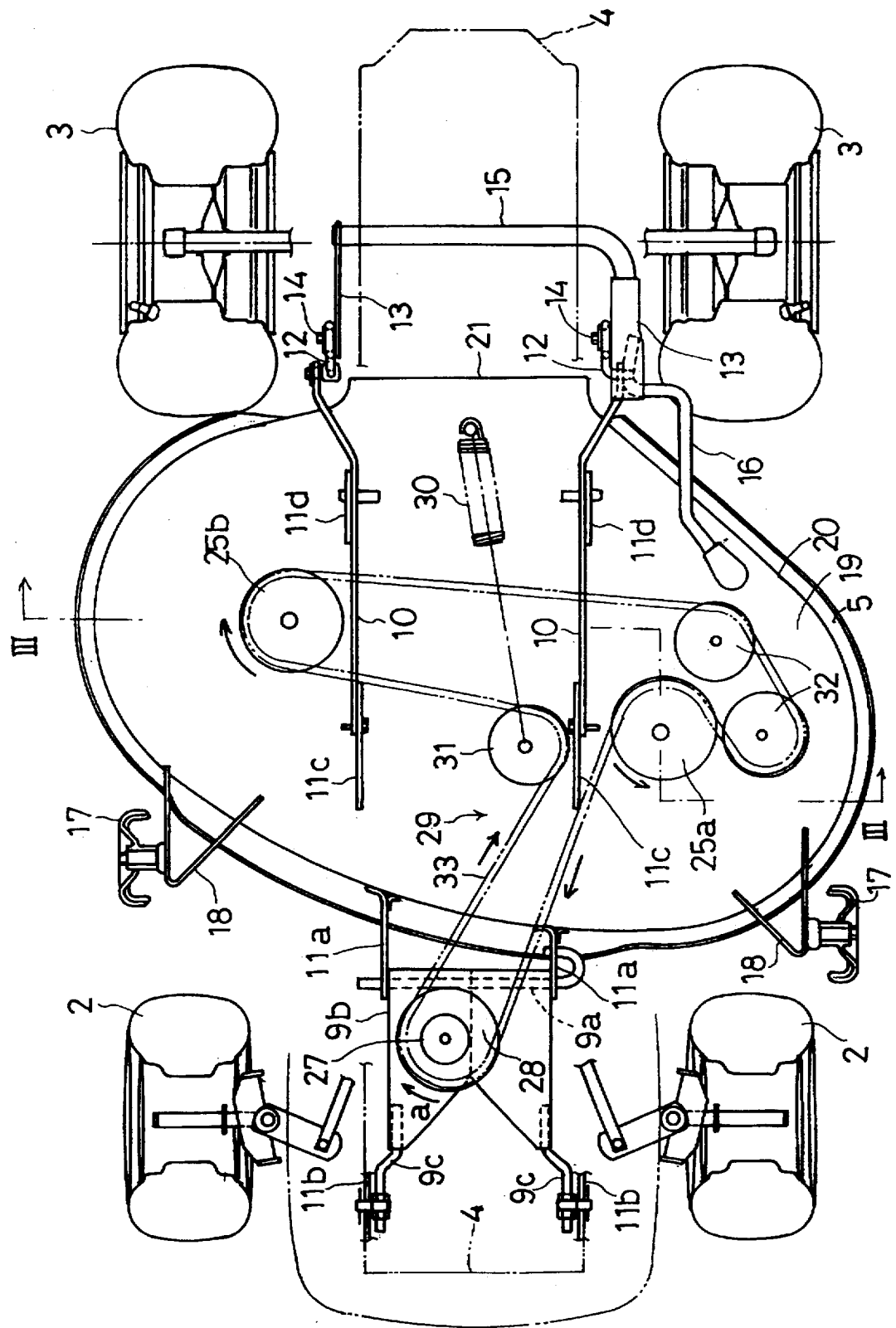
FIG. 2 is a plan view of an essential part of the mower showing a cutter housing and the vicinity thereof.

FIG. 1 is a side view showing an example of a riding mulching mower according to the present invention. The mulching mower 1 has a body frame 4 supported by a pair of right and left front wheels 2, 2 and a pair of right and left rear wheels 3, 3. A cutter housing 5 is movably suspended from a central bottom part of the body frame 4 up and down. FIG. 2 is a plan view showing the cutter housing 5 and the vicinity thereof.

An engine 6 is mounted in the front on the body frame 4, and a seat 7 is provided in the rear. A handle 8 is arranged between the engine 6 and the handle 8. The rear wheels 3 are driven by the engine 6 and the front wheels 2 are steered by the handle 8.

The cutter housing 5 is supported, so as to be suspended from the body frame 4, by means of front and rear links 9, 10. In more detail, the front link 9 comprises a plate-like link member 9b, having a rear end edge pivotally supported by a shaft 9a, between right and left brackets 11a, 11a, which project from the front end face of the cutter housing 5. The front link 9 also includes rod-like link members 9c, 9c, welded to both sides of a front end of the link member 9b, and having front ends pivotally supported by a pair of brackets 11b, 11b, which are suspended from a front end of the body frame 4. The rear link 10 also comprises a pair of right and left link members, each having both a front end pivotally supported by a bracket 11c on the side of the body frame 4 and a part, near a rear end, which is pivotally supported by a bracket 11d projecting from an upper surface of the cutter housing 5. Each link member 10 projects rearwardly beyond the bracket 11d and each link member is pivoted to a lower end of a lifting rod 12 at the rear end. Each lifting rod 12 has an upper end engaged with a pin 14 laterally projecting from a rocking member 13. The right and left rocking members are fixed to both ends of a rotary shaft 15 which crosses the body frame 4 and which are connected to each other through the rotary shaft 15. A lifting lever 16 is fixed on the rocking member 13 of the left side and projects forwardly therefrom.

Therefore, when the lifting lever 16 is rocked up and down about the rotary shaft 15, the right and left links 10 rock together about pivots to the brackets 11c. In response to this, the link 9 also rocks about the pivots to the brackets 11b, so that the cutter housing 5 moves up and down and thus, maintains a parallel relationship with the body frame 4.

Pivoted rollers 17, 17 through brackets 18, 18 are located at both sides of a front part of the cutter housing 5. The rollers 17 are fitted on the brackets 18 so that the height can be adjusted. By adjusting the height of the rollers 17, either the lowest position of the cutter housing or the height of the cut grasses can be set adequately.

Figure 3:
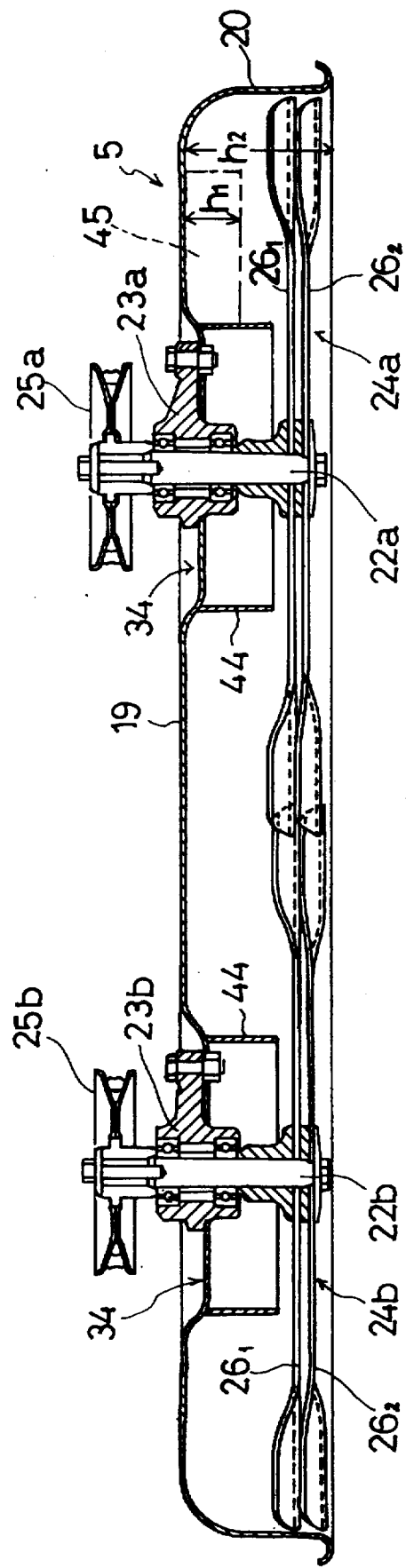
FIG. 3 is a cross-sectional view of the cutter housing taken along line III—III of FIG. 2.
Figure 4:
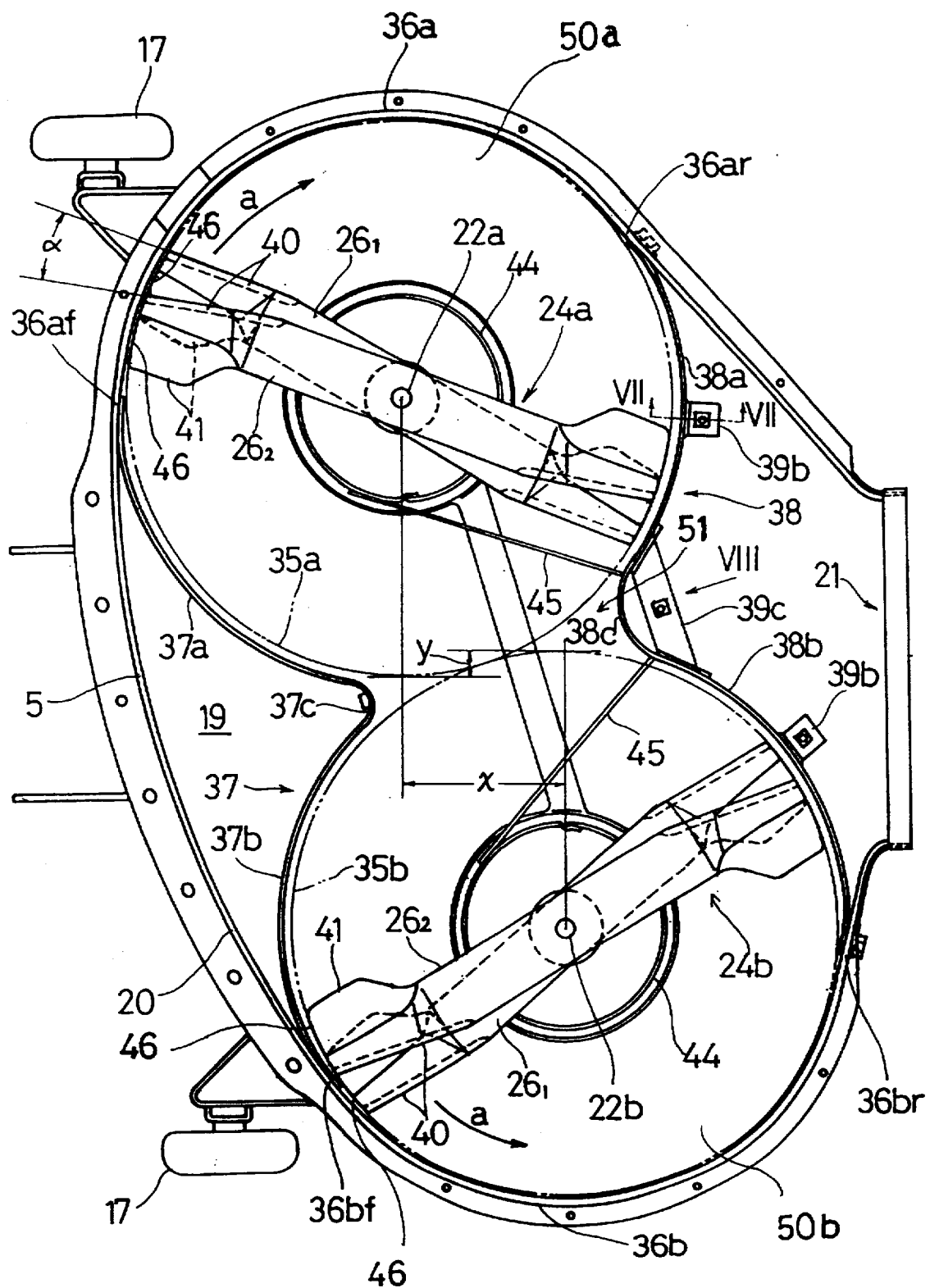
FIG. 4 is a plan view of the interior of the cutter housing as viewed from the under side thereof.

FIG. 3 is a cross-sectional view of the cutter housing taken along line III—III of FIG. 2, and FIG. 4 is a plan view of interior of the cutter housing 5, as viewed from the under side thereof.

As shown in FIGS. 1 to 4, the cutter housing 5 has a flat upper wall 19 and a side wall 20 which hangs down from a peripheral edge of the upper wall 19. The cutter housing 5 is opened downwardly. In addition, the interior of the cutter housing 5 is also opened rearwardly through an opening 21 formed at a rear end face part of the side wall 20.

Right and left cutter shafts 22b, 22a are arranged vertically within the cutter housing 5. These cutter shafts 22a, 22b rotatively pass through the upper wall 19 by means of bearings 23a, 23b fitted in the upper wall 19. Fixed cutter blades 246, 246 are positioned on lower end portions of the cutter shafts 22a, 22b within the cutter housing 5. Driven pulleys 25a, 25b are fixed on upper end portions of the cutter shafts which project upwardly from the upper wall 19. The cutter blades 24a, 24b are constituted by two elementary blades $26_1$, $26_2$, respectively. The two elementary blades $26_1$, $26_2$ are of the same shape and are arranged up and down with respect to each other as will be further described later.

The cutter shafts 22a, 22b are driven by the engine 6. For this purpose, as shown in FIGS. 1 and 2, a power take out shaft 27 of the engine 6 projects from under a front portion of the body frame 4 and a driving pulley 28 is provided at a lower end of the power take out shaft 27. The driven pulleys 25 are connected with the driving pulley 28 by means of a wrapping transmission device 29 which has a tension roller 31 and idle rollers 32 in addition to the pulleys. A belt 33, having a hexagonal cross-section, is wrapped around the pulleys. As shown by arrow a in FIG. 2, the power take out shaft 27 and the driving pulley 28 rotate in a clockwise direction as viewed from above. The belt 33, travelling in the direction of arrow a from the driving pulley 28, reaches the right driven pulley 25b through the tension roller 31 and goes around the pulley 25b in a clockwise direction. Then, the belt 33 advances to the left side of the vehicle body, reaches the left driven pulley 25a through the idle rollers 32, engages with the back side of the driven pulley 25a to travel around the pulley 25a in a counter-clockwise direction, and returns to the driving pulley 28.

Since the pulleys 25a, 25b, and the rollers 31, 32 are all arranged on a flat upper surface of the upper wall 19 of the cutter housing 5 so as to be in parallel with the upper surface and at the same height, wrapping of the belt 33 around the pulleys is easy, the entire wrapping transmission device 29 is made compact, and a sure transmission function can be obtained. In connection with this, the portions of the upper wall 19 (i.e. where the cutter shafts 22a, 22b penetrate through the bearings 23a, 23b) are formed in recesses 34, 34 to lower the height of the driven pulleys 25a, 25b. These recesses 34 also have an effect to reinforce the upper wall 19.

Thus, the left and right cutter blades 24a, 24b rotate in opposite directions from each other so that each of the cutter blades 24a, 24b moves from an inside to an outside in right and left directions at a front semicircular part of the rotation. This is mainly where mowing is carried out, as shown by arrows a in FIG. 4. Therefore, the cutter blades 24a, 24b move from front to rear at the left and right outsides, respectively, of the mulching mower 1.

In FIG. 4, left and right circles 35a, 35b (as illustrated by the double dashed and solid line) are tip end rotation loci of the cutter blade 24a, 24b. These tip end rotation loci 35a, 35b are in tangential contact, but the cutter shafts 22a, 22b are spaced apart by the distance x in the front and the rear. Therefore, the tip end rotation loci 35a, 35b overlap each other when viewed in the front and rear directions. Since the tip end rotation loci 35a, 35b are arranged in such a manner, when the mower 1 advances, grasses are mown over an entire width of the cutter housing 5, without leaving uncut grasses between the cutter blades 24a and 24b.

The tip end rotation loci 35a, 35b may overlap each other at a single plane, if the cutter blades 24a, 24b are synchronized to rotate with a certain phase difference between them.

Side wall portions 36a, 36b of the side wall 20 of the cutter housing 5 at the left and right outsides, respectively, extend along peripheries of the tip end rotation loci 35a, 35b, respectively, at a slight distance of about or over one-half the diameter of the circle created by the peripheries of the tip end rotation loci 35a, 35b. The side wall portions 36a, 36b start to part from the peripheries of the tip end rotation loci 35a, 35b at front end portions 26af, 36bf which are connected to each other by a front enclosure wall portion 37.

Figure 5:
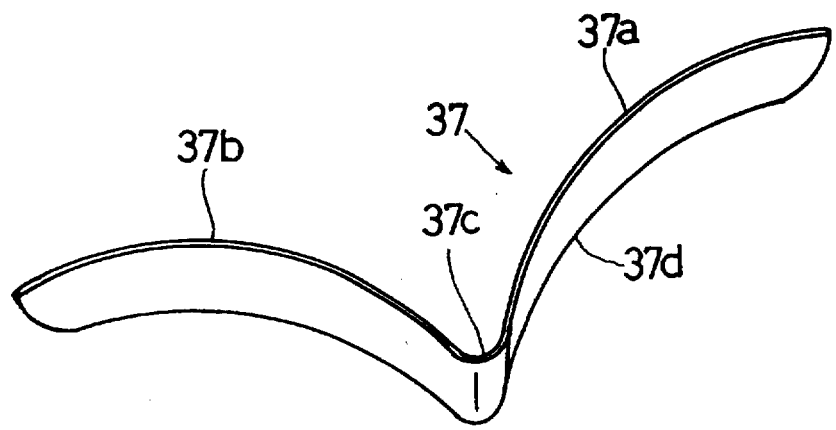
FIG. 5 is a perspective view of a front enclosure wall portion.

The front enclosure wall portion 37 is composed of a rounded V-shaped piece comprised of: an arcuate portion 37a extending from the front end portion 36af of the side wall portion 36a to the inside along the tip end rotation locus 35a at a slight distance; an arcuate portion 37b extending from the front end portion 36bf of the side wall portion 36b to the inside along the tip end rotation locus 35b at a slight distance; and a central portion smoothly connecting the arcuate portions 37a, 37b (see FIG. 5). The front enclosure wall portion 37 hangs down from an under surface of the upper wall 19 of the cutter housing 5 by welding the upper end face 37d to the under surface. However, the front enclosure wall portion 37 may be detachably attached to the cutter housing by means of a bolt and nut, or similar, to facilitate cleaning of a front underneath part of the cutter housing 5.

Figure 6:
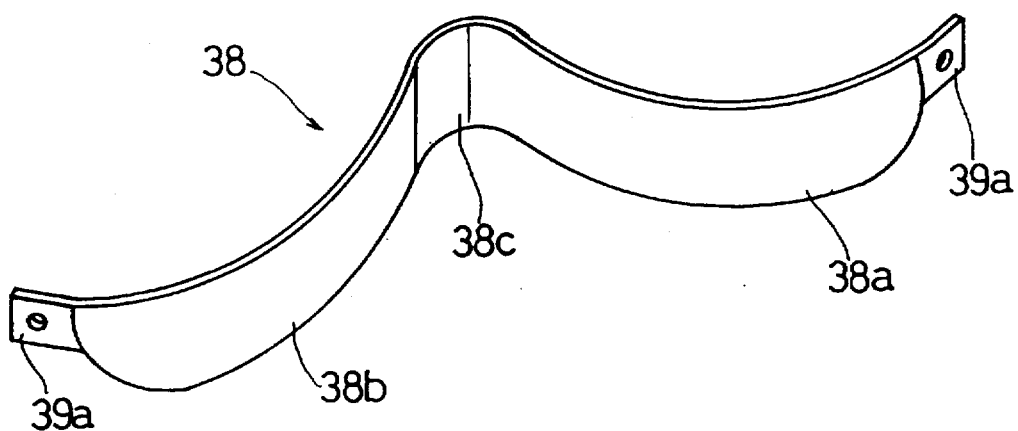
FIG. 6 is a perspective view of a rear enclosure wall portion.
Figure 7:
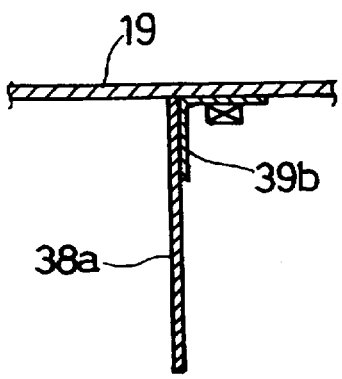
FIG. 7 is an enlarged cross-sectional view taken along line VII—VII of FIG. 4.

Rear end portions 36af, 36br of the side wall portions 36a, 36b, at which the side wall portions 36a, 36b start to part from the peripheries of the tip end rotation loci 35a, 35b, are connected with each other by a rear enclosure wall portion 38. Similarly to the front enclosure wall portion 37, the rear enclosure wall portion 38 is also composed of a rounded V-shaped piece having arcuate portions 38a, 38b on both sides which are connected with each other at a central portion 38c (see FIG. 6). The rear enclosure wall portion is detachably attached to an under surface of the upper wall 19. For this purpose, attachment pieces 39a, 39a project from both ends of the rear enclosure wall portion 38. The attachment pieces 39a, 39a are to be positioned along the rear end portion 36ar of the side wall portion 36a and the rear end portion 36br of the side wall portion 36b (see FIG. 6), respectively. L-shaped attachment pieces 39b, 39b are welded to and project from side surfaces of the arcuate portions 38a, 38b (see FIG. 7). An attachment piece 39c, having bent portions at both ends welded to the side surfaces of the arcuate portions 38a, 38b, respectively (see FIG. 8), is provided at a central portion 38c. The attachment pieces 39a, 39a are fixed to the rear end portions of the side wall portions 36a, 36b by screws. The attachment pieces 39b, 39b and the attachment piece 39c are fixed to the upper wall 19 of the cutter housing 5 by screws. Therefore, by removing the rear enclosure wall portion 38, the mower can be used as a riding mower of the type that can discharge cut grass clippings to the rear or into a grass bag provided at the rear.

The side wall portions 36a, 36b, front enclosure wall portion 37 and rear enclosure wall portion 38 form a continuous enclosure wall completely surrounding the outer periphery of both cutter blades 24a, 24b. The major part of the enclosure wall, except for the central portions 37c, 38c of the front and rear enclosure wall portions 37, 38, extends closely along the tip end rotation loci 35a, 35b of the cutter blades 24a, 24b. The enclosure wall is guitar-shaped or FIG. 8 shaped so as to be constricted at the central portions 37c, 38c. Within the enclosure wall, the cutter blades 24a, 24b rotate so that the tip ends are close to the inner surface of the enclosure wall at the greater part of the angle of rotation, except for the part between the central portions 37c, 38c.

In other words, circular cutter chambers 50a, 50b are formed around the left and right cutter blades 24a, 24b, respectively, by the enclosure wall. The cutter chambers 50a, 50b communicate with each other at the central portion (blade approaching portion) 51 where the tip end rotation loci 35a, 35b approach each other.

As noted above, each of the cutter blades 24a, 24b is constituted by two elementary blades $26_1$, $26_2$ which are arranged above and below each other. The blades $26_1$, $26_2$ are of the same shape. The blades $26_1$, $26_2$ have cutting edges at radially outward and rotationally leading portions. The blades $26_1$, $26_2$ also have feather sections rising obliquely upwardly at trailing edges. However, the blades $26_1$, $26_2$ are fitted to the cutter shaft 22 in such a manner that the upper blade $26_1$ advances in the direction of rotation by an angle α as compared with the lower blade $26_2$. Therefore, when the cutter blade 24 rotates, grasses in front are cut relatively long by the upper blade $26_1$ at first, and then cut short by the lower blade $26_2$, so that finely cut grass clippings 43 are obtained. Since the circumference of the cutter blade 24 is surrounded by the enclosure wall, the grass clippings 43 stay within the enclosure wall for some time and are cut more finely if they are hit by the cutting edge 40 during their stay within the enclosure wall.

Within the cutter chamber 50a, 50b which are surrounded by the enclosure wall, a wind is generated by the feather sections 41 of the rotating blades $26_1$, $26_2$ and a part of the wind becomes a discharge wind which is blown out downwardly from the opening at the bottom of the cutting housing 5. The grass clippings 43, confined and flying about within the enclosure wall, are dropped onto the cut grass path by the discharge wind sooner or later and the grass clippings 43 are then sunk under the surface of the grass.

Figure 8:
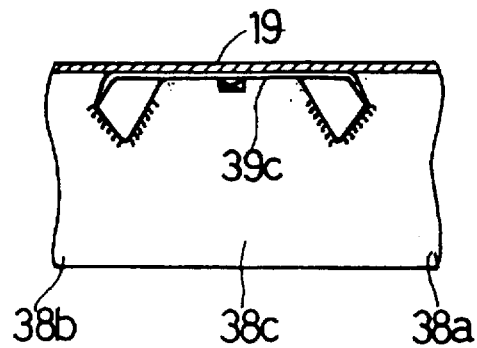
FIG. 8 is a front view of a part of FIG. 4 viewed in the direction of arrow VIII.

The enclosure wall is formed in a guitar-shape or figure 8 shape by connecting the left circular portion which is surrounded by the side wall portion 36a, the arcuate portion 37a of the front enclosure wall portion 37, and the arcuate portion 38a of the rear enclosure wall portion 38 with the right circular portion which is surrounded by the side wall portion 36b. The arcuate portion 37b of the front enclosure wall portion 37 and the arcuate portion 38b of the rear enclosure wall portion 38, and the cutter blades 24a, 24b rotate in opposite directions to each other so as to cut the grasses 42 by rotating toward the outside in right and left directions at the front parts of the circular portions. Therefore, the grass clippings cut by a cutter blade 24 stay within the circular portion corresponding to the cutter blade, hardly move to the other circular portion, and are discharged under the cutter blade. Accordingly, even if a kicker is not provided for directing the grass clippings downwardly, the inner surface of the upper wall 19 of the cutter housing 5 is substantially flat, so that the grass clippings 43 are dropped on the cut grass path beneath the portion surrounded by the enclosure wall and dispersed evenly over the entire area.

Rings 44, surrounding the cutter shafts 22, hang down under the right and left recesses 34. A separator member 45, extending tangentially from a peripheral surface of the ring 44, reaches the vicinity of the central portion 38c of the rear enclosure wall portion 38. The separator member 45 will be described later in more detail.

Since the side wall 20 of the cutter housing 5 has an opening 21 at the rear, the mulching mower can be easily converted into a rear discharge type mower, if necessary, by removing the detachable rear enclosure wall portion 38. In this case, the separator members 45 act to smoothly guide the grass clippings to the opening 21 so that no interference occurs between the grass clippings on the side of the cutter blade 24a and those on the side of the cutter blade 24b.

The tip ending portion of the left and right cutter blades 24a, 24b move from the front to the rear at the left and right outsides of the mower 1, respectively. Therefore, the cutter blades 24a, 24b approach the grasses, which are lying down in the running direction of the mower 1 due to the tires running over them beforehand which makes them difficult to cut, from the front and cut the grasses while raising them at the same time. Accordingly, the wheel traces of trodden grass caused by the front tires can also be mown with a good finish.

The enclosure wall surround the cutter blades 24a, 24b is not a separate wall provided within the cutter housing having the side wall 20 along the periphery, but both side parts of the enclosure wall are formed by the side wall portions 36a, 36b at the left and right outsides of the cutter housing 5. The enclosure wall is formed by merely adding the front and rear enclosure portions 37, 38 which have simple shapes. Accordingly, the shape of the cutter housing 5 can be made nearly identical to the shape of the rotational region of the cutter blades 24 in an attempt to miniaturize, reduce the weight of, and simplify the cutter housing.

Figure 11:
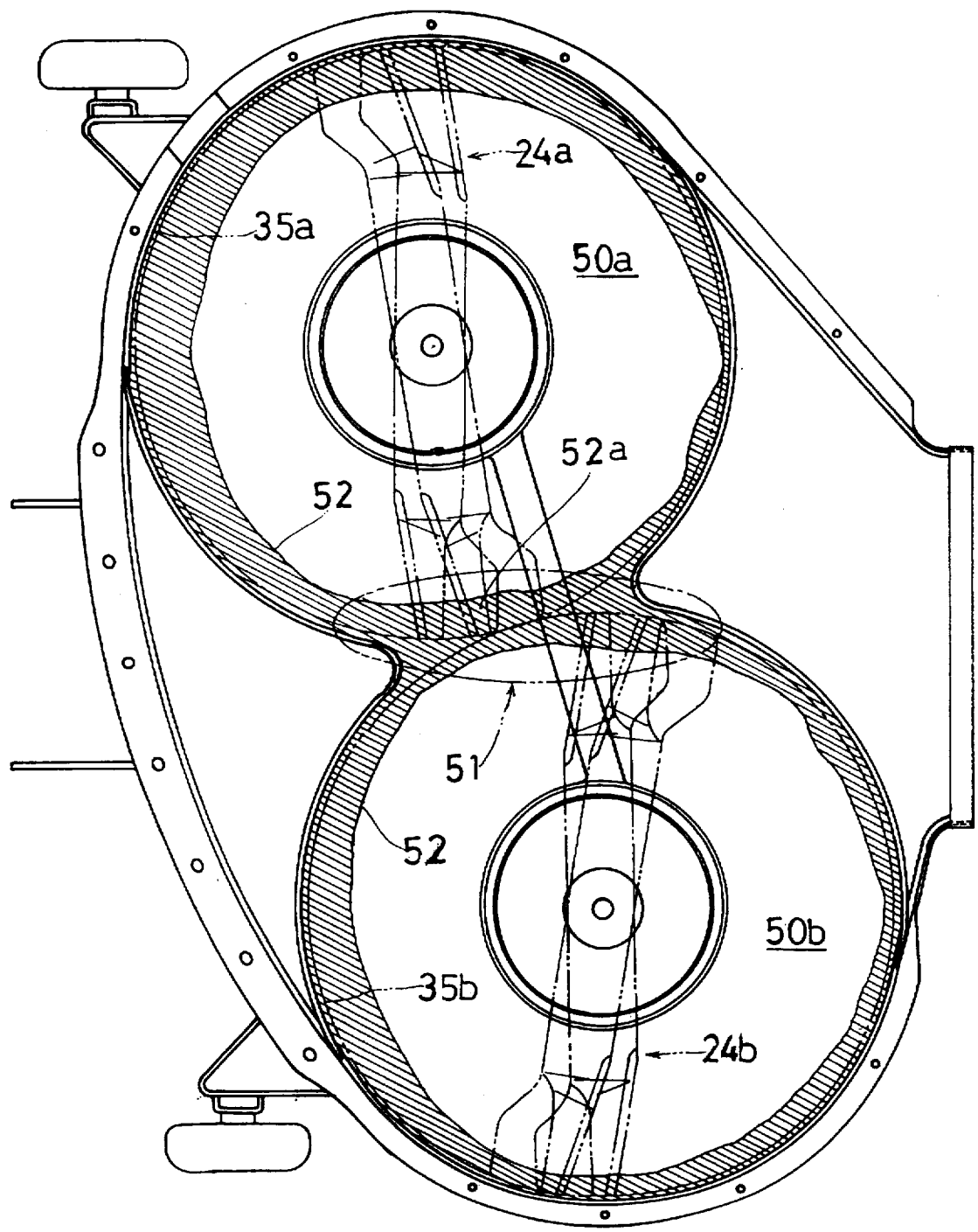
FIG. 11 is a plan view similar to FIG. 4 showing wind distribution at a discharging portion before the installation of separator member.

FIG. 11 shows the distribution of the discharge wind within the enclosure wall having the shape formed by the left and right cutter chambers 50a, 50b communicating with each other at the central blade approaching portion 51. However, it is to be noted that no separator member is installed in this case. The shaded portion 52 of the FIG. 11 is a discharge portion where a downwardly directed discharge wind is generated. The discharge portion 52 is formed along the tip end rotation loci 35a, 35b of the cutter blades 24a, 24b.

At a portion where the discharge portion 52 extends along the inner surface of the enclosure wall, the grass clippings 43 are dispersed evenly in a circumferential direction, while circulating along the inner surface and discharged tangentially downwardly to the tip end rotation locus 35 by the downwardly directed discharge wind. However, there is no enclosure wall in the blade approaching portion 51 where the grass clippings of the side of the cutter chamber 50a and the grass clippings of the side of the cutter chamber 50b join each other from the rear. Accordingly, the grass clippings are not guided in a predetermined direction by the enclosure wall in the blade approaching portion 51. Therefore, an especially large quantity of grass clippings fall down there so that the grass clippings on the cut grass path are not dispersed evenly to spoil the looks of the cut grass path.

In addition, at the blade approaching portion 51, grasses, before being mown, are laid down by the discharge wind which is blown downwardly and the cutter blade 24 passes over, above the laid down grasses, so that uncut grasses are likely to be left.

Figure 9:
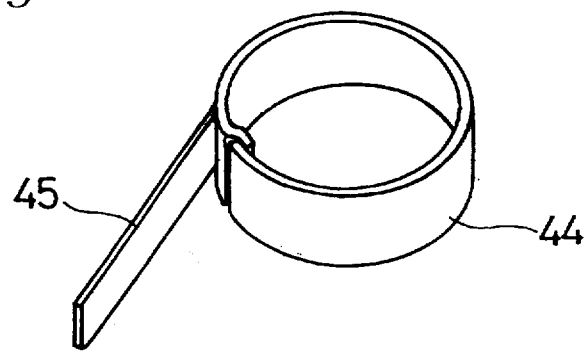
FIG. 9 is a perspective view of a ring and a separator member.
Figure 10:
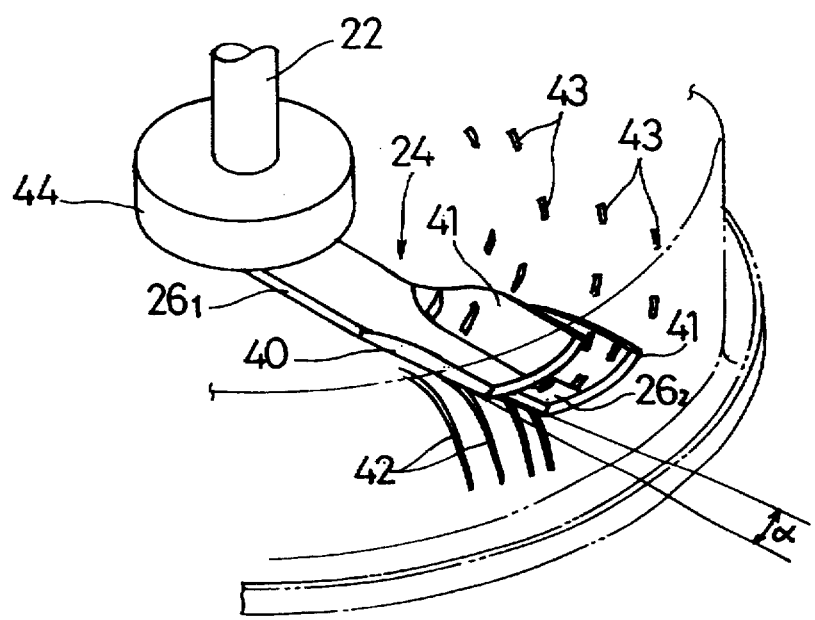
FIG. 10 is a rough perspective view showing a state of cutter blades during mowing.

In order to prevent such an inconvenience, the separator member 45 is provided. As shown in FIG. 9, the separator member 45, formed in a rectangular plate, extends from the vicinity of the central portion 38c of the rear wall portion across the direction of rotation of the cutter blade 24 and is fixed to the circumferential surface of the ring 44 which surrounds the cutter shaft 22, within the corresponding cutter chamber 50. The separator member is arranged vertically between the upper wall 19 of the cutter housing 5 and the cutter blade 24. The ring 44 may be rectangular. Further, a member for sealing the cutter shaft 22 may be provided above the blade in place of the ring 44 and connected to the separator member 45. In the alternative, the inner end of the separator member 45 may be separated from the ring 44 and the separator member 45 may be attached to the under surface of the upper wall of the cutter housing.

Since such a separator member 45 is provided at a place in the cutter chamber 50 where a wind, in the direction of blade rotation, flows into the blade approaching portion 51, the wind, flowing into the blade approaching portion 51 to be discharged downwardly, is interrupted at an upper part by the separator member 45 and flows into the blade approaching portion 51 only passing under the separator 45. As the result, a low pressure condition is caused in a downstream side of the separator member 45 which is screened from the wind, and the wind, having flowed into the blade approaching portion 51a from the bottom, flows to the low pressure portion to cause an upwardly directed wind at the blade approaching portion 51.

Figure 12:
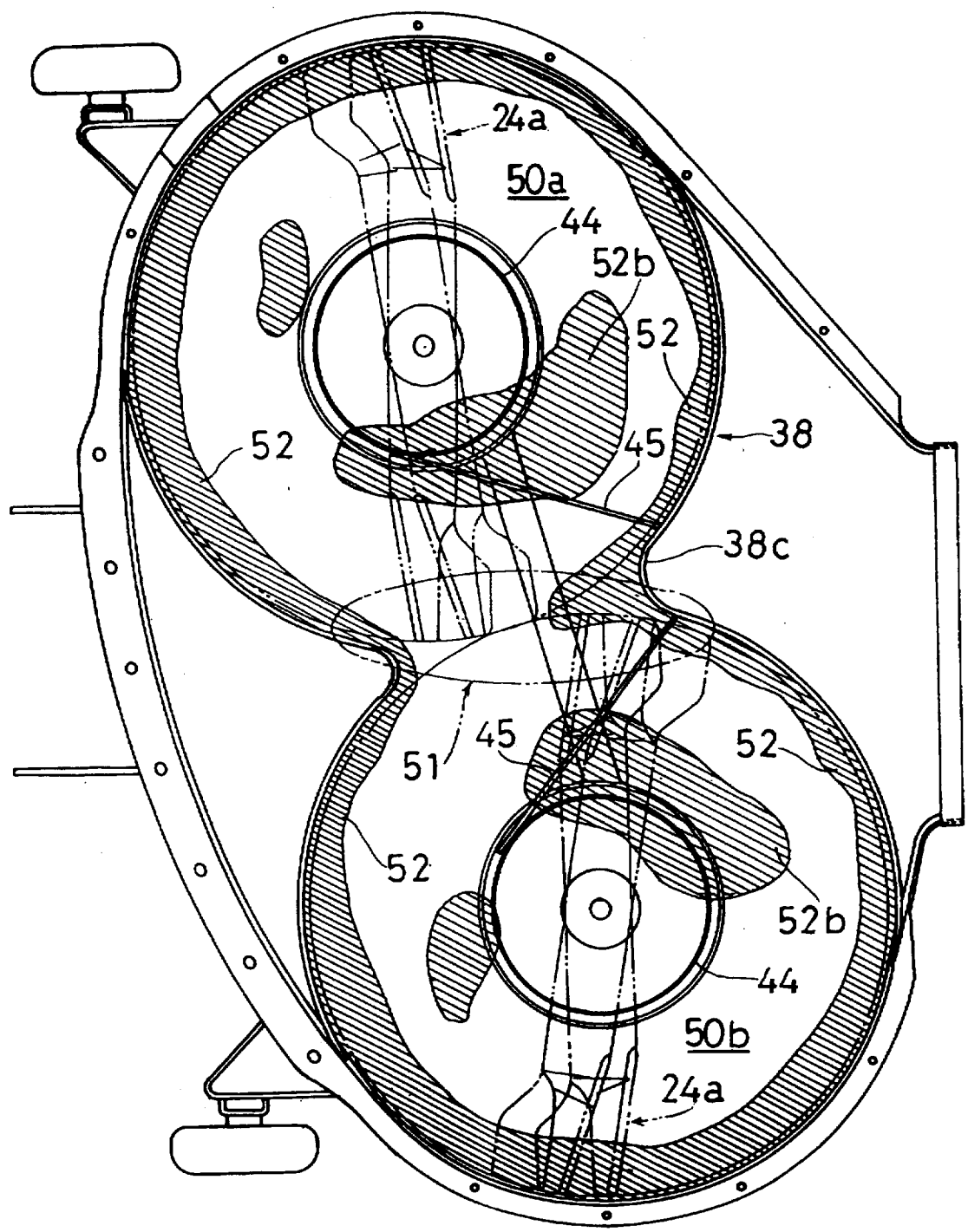
FIG. 12 is a plan view similar to FIG. 4 showing wind distribution at the discharging portion after installation of the separator member.

FIG. 12 shows a distribution of the discharge portions 52 within the enclosure wall in a case where the separator member 45 is installed. The discharge portion 52a, at the blade approaching portion 51 shown in FIG. 11, is not shown in FIG. 12 as having the separator member 45. According to such a change in distribution of the discharge portions at the blade approaching portion 51, the quantity of grass clippings falling down from the blade approaching 51 is reduced and an especially large quantity of the grass clippings is prevented from being dropped on the cut grass path. Further, as a result, the separator member 45 interrupts the wind, and a high pressure portion is caused, at an upstream side of the separator member 45, to generate a downwardly directed wind. Since the separator member 45 is obliquely projected from the rear wall portion 38 in the direction of the cutter blade rotation and is tangentially connected to the ring 44 at the radial inside portion, as shown in FIG. 12, an additional discharge portion 52b is produced at an upstream side of the separator member 45 and at a radial inner portion of the cutter chamber 50 or at a rear and inner side with respect to the direction of cutter blade rotation. Thus, the grass clippings are discharged on the cut grass path under the cutter housing so as to be unbiased and well dispersed to improve the looks of the cut grass path.

The upwardly directed wind, generated at the blade approaching portion 51 as described above, raises uncut grasses at the blade approaching portion 51. After that, the grasses are cut by the cutter blade 24 subsequently passing thereover. Therefore, the grass can be mown, without leaving any uncut grasses, so as to have a good finish. The ring 44 prevents grass clippings from entering into the bearing portion of the cutter shaft 22 and regulates the wind generated within the cuter chamber, as well as supports the separator member.

The height $h_1$ of the separator member 45 is preferably a half of the height $h_2$ of the cutter housing. For example, when $h_2$ is 100 mm, $h_1$ is preferably about 50 mm (FIG. 3). A cutout 53 is formed at a front lower portion of the side wall 20 of the cutter housing 5 to facilitate uncut grasses in front entering into the cutter housing 5 (FIG. 1).

Figure 13:
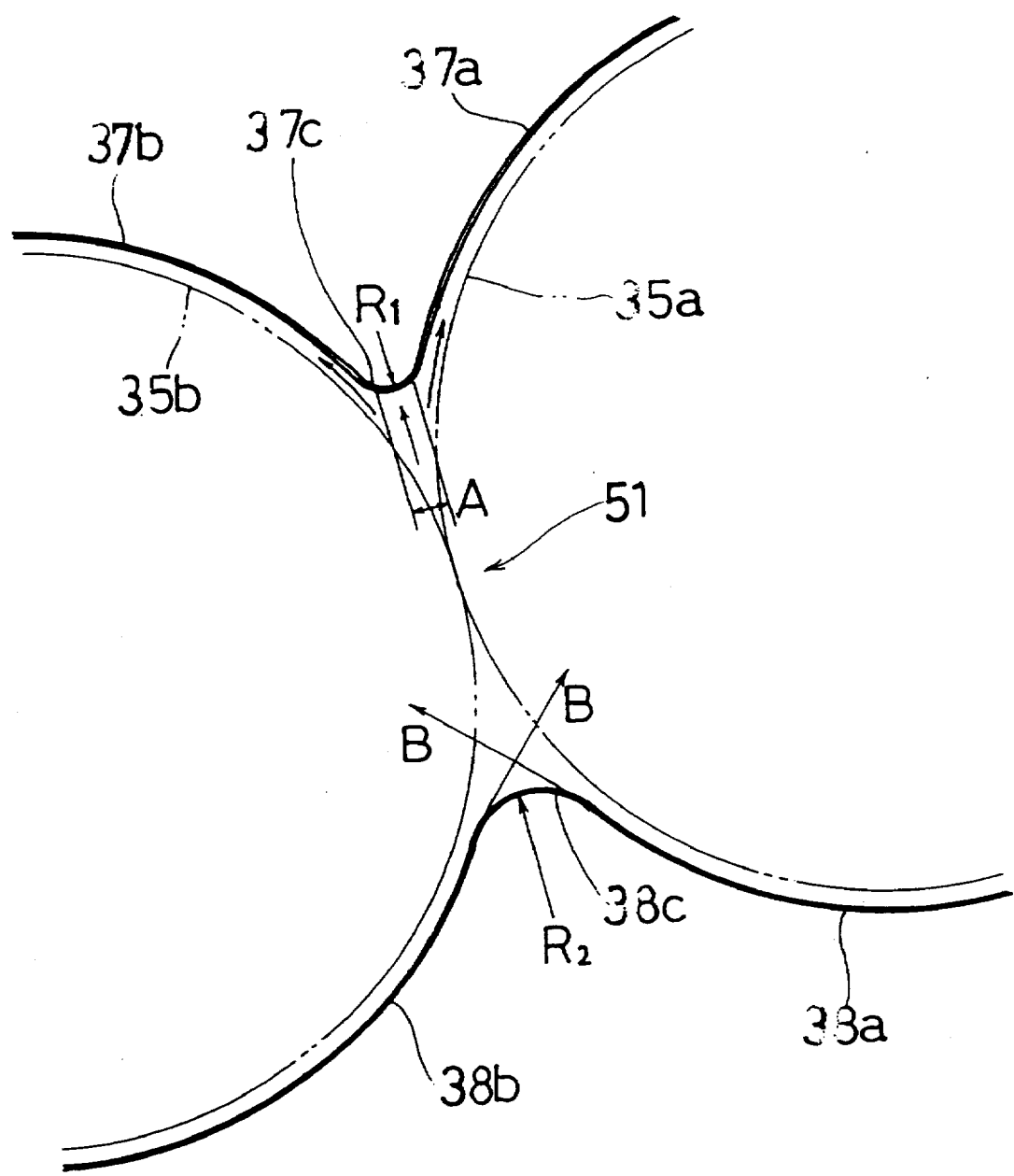
FIG. 13 is a sketch for explaining shapes of central parts of the front wall portion and the rear wall portion.

The dropping of grass clippings entering the blade approaching portion 51 from the rear is also caused by direct collision of the grass clippings with the central portion 37c of the front wall portion 37 so that the quantity of grass clippings discharged there is increased. Therefore, the radius of curvature $R_1$ of the central portion 37c is made small. As shown in FIG. 13, grass clippings are turned aside by the small radius portion so as to run along left and right arcuate portions 37a, 37b and an area A of the portion with which the grass clippings directly collide becomes small to reduce the quantity of grass clippings dropped by the collision.

On the other hand, radius of curvature $R_2$ of the central portion 38c of the rear wall portion 38 is set larger than the radius of curvature $R_1$ of the central portion 37c. Accordingly, as shown in FIG. 13 by arrow B, directions of flows of grass clippings entering into the blade approaching portion 51 along the left and right arcuate portions 38a, 38b of the rear wall portion 38 deviate largely from the direction to the direct collision area portion A so that the quantity of grass clippings colliding with the front wall portion and falling down at the blade approaching portion 51 is decreased even more.

Since grasses contain much water, the grass clippings 43 which stay and float within the enclosure wall are apt to adhere and accumulate on the inner surface of the enclosure wall. The adhering grass clippings are scraped off by outer ends of the rotating cutter blade 24, but if the scraping off is not carried out sufficiently, large clumps of the grass clippings may fall down periodically or the adhering grass clippings may lock the cutter blade 24 so that sometimes continuation of the mowing work becomes impossible.

Figure 14:
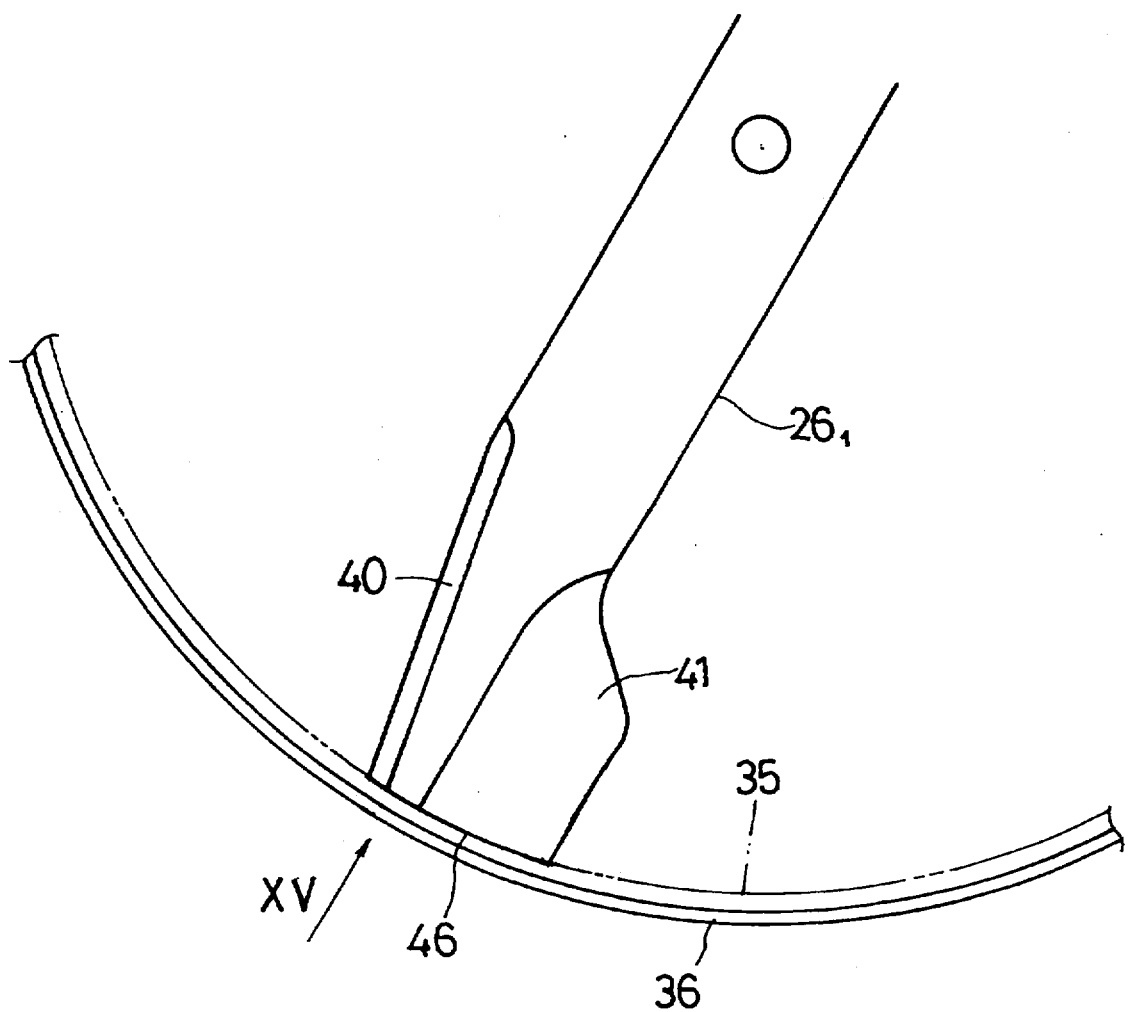
FIG. 14 is an enlarged plan view of an outer part of the blade.

Therefore, the shape, in plan view, of the outer end of the cutter blade 24, which plays the role of scraping off grass clippings adhering to the inner surface of the enclosure wall, is formed in a circular arc coinciding with the tip end rotation locus 35 over the entire width in the rotational direction of the cutting blade 24. In case of the present embodiment, since the cutter blade 24 is composed of the upper and lower blades $26_1$, $26_2$, the outer ends 46, 46 of the blades $26_1$, $26_2$ form a circular arc, as shown in FIG. 4. FIG. 14 shows only the outer end of the blade $26_1$ in enlarged scale.

Because the enclosure wall, for example the side wall portion 36, extends along the tip end rotation locus 35 at a slight distance therefrom, the trace of the blade outer end 46 is a circular arc in shape which is concentric with a circle formed by the inner surface of the enclosure wall. Therefore, the outer end 46 circulates along the inner surface always uniformly close to the surface over the entire width.

Figure 15:
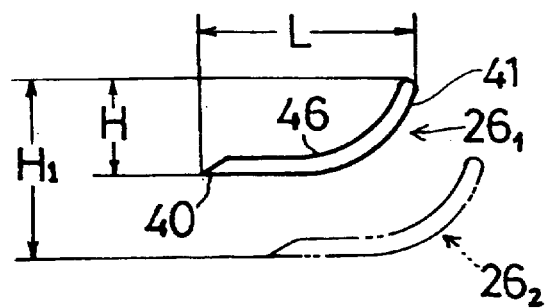
FIG. 15 is a rough front view of an outer end face of the blade viewed in the direction of arrow XV of FIG. 14.

Since the radial outer portion of the blade $26_1$ is provided with a cutting edge 40 at the leading edge and a feather section rising obliquely upwardly at the trailing edge, as shown in FIG. 15, the end face of the outer end 46 slidingly contacts the inner surface of the enclosure wall over a range of heights H, from the lower cutting edge 40 to the higher upper edge of the feather section 41, and slidingly contacts the inner surface over a range of lengths L in the rotational direction. Thus, the grass clippings, which adhere to the enclosure wall in the range of heights H and lengths L, are uniformly and surely scraped off. In this embodiment, because another blade $26_2$ exists under the blade $26_1$, the range of heights over which the end of the blade is capable of scraping is doubled from H to $H_1$.

Thus, the grass clippings not scraped off will not inconveniently accumulate on the inner surface of the enclosure wall, large quantities of the grass clippings will not fall down periodically, and the grass clippings will not lock the blade.

In order to obtain finely cut grass clippings by mowing the grasses 42 raised by the pulsation of the wind with the cutting edges 40 of the blades $26_1$, $26_2$ in succession, the vertical distance D between the blades $26_1$, $26_2$ is preferably set in the following range:

$$12.5\ mm < D < 24.5\ mm$$

Very good result can be obtained, particularly when the vertical distance D is set in the range, as follows:

$$17.5\ mm < D < 19.5\ mm$$

When D has the value at the midpoint of the range given immediately above, namely, about 18.5 mm, the most excellent finely cut grass clippings are obtained. When D is smaller than 18.5 mm, mowing may be finished in a better manner and when D is larger than 18.5 mm, the dispersion of the grass clippings 43 on the cut grass path tends to be improved.

As for the difference angle α between the upper and lower blades $26_1$, $26_2$ in the rotational direction, when the angle α is set in the following range:

$5° < \alpha < 15°$ good finely cut grass clippings are obtained, and particularly when set to about 10°, excellent finely cut grass clippings can be obtained.

In addition, if distance D and angle $\alpha$ are set within the two immediately above-described ranges, respectively, a phase difference hardly ever occurs between pulsations of winds generated by the feather sections of the upper and lower blades $26_1$, $26_2$. Furthermore, a pulsation equal to that caused by a single feather section having a large twist (i.e., rising height) is obtained by the feather sections 41. In other words, each of the feather sections 41 of the blades $26_1$, $26_2$ can be made relatively low, so that a resistant force acting on the each blade is reduced and the blades $26_1$, $25_2$ can be simplified and lightened.

Further, the cutting edge and the feather section of the upper and lower blades $26_1$, $26_2$ are made to be about the same shape. This is advantageous for manufacturing and maintenance of the mower. It is also possible to make the upper and lower blades of the same shape. In this case, manufacturing and preparing only one kind of cutter blade will do, so that manufacturing and construction of the mower are simplified and the maintenance becomes easy.

What is claimed is:

1. A mulching mower, comprising:
   a cutter housing which opens downwardly and which includes an upper wall;
   a pair of cutter blades positioned such that a first cutter blade is ahead of a second cutter blade and said pair of cutter blades are arranged to a right and a left of an approximate center of said mower in said cutter housing, wherein each of said cutter blades rotates approximately horizontally in opposite directions to each other so that tip ends of each of said cutter blades move from a front of said mower to a rear of said mower, and wherein each of said cutter blades includes an upper blade and a lower blade;
   side walls including side wall portions forming right and left outer peripheries of said cutter housing, wherein said side wall portions extend along a tip end rotation locus of a corresponding one of said cutter blades, respectively, at a slight distance radially therefrom;
   a front enclosure wall portion connecting front parts of said side wall portions with each other, wherein said front enclosure wall portion hangs down from an under surface of said upper wall of said cutter housing, and wherein said front enclosure wall portion has right and left arcuate portions each extending along said tip end rotation locus of said corresponding one of said cutter blades, respectively, at said slight distance radially therefrom, said right and left arcuate portions of said front enclosure wall portion being connected to each other at a middle of said front enclosure wall portion; and
   a rear enclosure wall portion connecting rear parts of said side wall portions with each other, wherein said rear enclosure wall portion hangs down from said under surface of said upper wall of said cutter housing, and wherein said rear enclosure wall portion has right and left arcuate portions each extending along said tip end rotation locus of said corresponding one of said cutter blades, respectively, at said slight distance radially therefrom, said right and left arcuate portions of said rear enclosure wall portion being connected with each other at a middle of said rear enclosure wall portion;
   said side wall portions and said front and rear enclosure wall portions forming an approximately figure eight-shaped enclosure wall surrounding said cutter blades along said tip end rotation locus of each of said corresponding ones of said cutter blades.

2. The mulching mower claimed in claim 1, wherein said cutter housing also opens rearwardly, when said rear enclosure wall portion is detached from said cutter housing.

3. The mulching mower claimed in any one of claims 1 and 2, wherein a tip end of each of said cutter blades moves rotationally from said front of said mower to said rear of said mower at a position to a rear of a front wheel of said mower.

4. The mulching mower claimed in any one of claims 1 and 2, wherein said under surface of said upper wall of said cutter housing is substantially flat.

5. A mulching mower, comprising:
   a cutter housing which opens downwardly and which has an upper wall;
   a pair of cutter blades positioned such that a first cutter blade is ahead of a second cutter blade and said pair of cutter blades are arranged to a right and a left of an approximate center of said mower in said cutter housing, wherein said cutter blades rotate in opposite directions to each other so that tip ends of said cutter blades move from a front of said mower to a rear of said mower, and wherein each of said cutter blades include an upper blade and a lower blade;
   a figure eight-shaped enclosure wall which hangs down from an under surface of said upper wall of said cutter housing to surround a periphery of said cutter blades along tip end rotation loci of said cutter blades;
   circular cutter chambers formed by said enclosure wall around said cutter blades, wherein said circular cutter chambers communicate with each other at a central portion where said tip end rotation loci approach each other; and
   plate-like separator members extending from a position on a rear wall portion of said enclosure wall near said central portion where said tip end rotation loci approach each other to a vicinity of a rotary shaft of each of said cutter blades across a direction of rotation of said cutter blades, wherein said plate-like separator members are arranged approximately vertically between said under surface of said upper wall of said cutter housing and each of said cutter blades.

6. The mulching mower claimed in claim 5, wherein said enclosure wall comprises front and rear wall portions each formed by connecting right and left arcuate portions extending along said tip end rotation loci of said cutter blades at a slight distance radially therefrom through central portions between said right and left arcuate portions of said front and rear wall portions, respectively, a radius of curvature of said central portion of said front wall portion being smaller than a radius of curvature of said central portion of said rear wall portion.

7. The mulching mower claimed in claim 5, wherein an end of each of said separator members at said vicinity of said rotary shafts of said cutter blades is fixed to a circumferential surface of a ring member surrounding each of said rotary shafts concentrically.

8. The mulching mower claimed in claim 5, wherein grass clippings are dropped by each of said separator members at a rear inner side of each of said separator members with respect to a direction of rotation of each of said cutter blades.

9. A mulching mower comprising:
   a cutter housing which opens downwardly and which has an upper wall;
   a pair of cutter blades positioned such that a first cutter blade is ahead of a second cutter blade, which are arranged to a left and to a right, and which rotate approximately horizontally in said cutter housing, wherein each cutter blade of said pair of cutter blades includes an upper blade and a lower blade, wherein each cutter blade of said pair of cutter blades rotates in opposite directions, and wherein a trailing side of said upper blade overlaps a leading side of said lower blade in a vertical direction;

a circular enclosure wall surrounding a periphery of each of said cutter blades along a tip end rotation locus of each of said cutter blades at a slight distance radially therefrom, wherein each of said cutter blades has a cutting edge at a radially outer and rotationally leading side and a feather section rising obliquely upwardly at said trailing side, and wherein a shape in plan view of an outer end of each of said cutter blades is formed in a circular arc concentric with said enclosure wall, and wherein said feather section of each of said upper blade and said lower blade is similarly shaped.

10. A mulching mower comprising:

a cutter housing which opens downwardly and which has an upper wall;

a pair of rotary shafts provided approximately vertically in said cutter housing;

upper and lower cutter blades provided on a lower portion of each of said rotary shafts so as to rotate approximately horizontally, wherein each of said upper and lower cutter blades have a cutter edge portion with a cutter edge at a leading edge, wherein widths of said cutter edge portions of said upper and lower cutter blades in a rotational direction are substantially equal, wherein feather sections are twisted upwardly and are formed at trailing edges of said cutting edge portions of said upper and lower cutter blades, respectively, and wherein said upper and lower cutter blades are fitted to each of said rotary shafts leaving a space between said cutter blades in a vertical direction and positioning said cutting edge of each of said upper cutter blades rotationally ahead of said cutter edge of each of said lower cutter blades, wherein said trailing edge of each of said upper cutter blades overlaps said cutting edge of each of said corresponding lower cutter blades in said vertical direction.

11. The mulching mower claimed in claim 10, wherein said space in said vertical direction between said upper and lower cutter blades is more than 12.5 mm and less than 24.5 mm.

12. The mulching mower claimed in claim 10, wherein an angular difference in said rotational direction between said upper and lower cutter blades is more than 5° and less than 15°.

13. The mulching mower claimed in claim 10, 11 or 12, wherein lengths of said upper and lower cutter blades are equal.

14. The mulching mower claimed in claim 13, wherein said upper and lower cutter blades have similar shapes.

* * * * *